United States Patent [19]
Venema

[11] Patent Number: 5,199,082
[45] Date of Patent: Mar. 30, 1993

[54] METHOD OF DETECTING AN AMPLITUDE TRANSIENT IN A FIELD OF ELEMENTS HAVING A MULTIVALENT AMPLITUDE DISTRIBUTION, DEVICE SUITABLE FOR PERFORMING THE METHOD, AND VIDEO SYSTEM INCLUDING THE DEVICE

[75] Inventor: Willem J. Venema, Eindhoven, Netherlands

[73] Assignee: U.S. Philips Corp., New York, N.Y.

[21] Appl. No.: 798,251

[22] Filed: Nov. 1, 1991

Related U.S. Application Data

[63] Continuation of Ser. No. 581,500, Sep. 11, 1990, abandoned.

[30] Foreign Application Priority Data

Sep. 11, 1989 [NL] Netherlands ............... 8902257

[51] Int. Cl.$^5$ .............................................. G06K 9/48
[52] U.S. Cl. ........................................ 382/22; 382/27; 382/48
[58] Field of Search ............. 382/22, 8, 27, 48, 54; 358/101, 106, 107, 133

[56] References Cited

U.S. PATENT DOCUMENTS

| | | | |
|---|---|---|---|
| 4,630,307 | 12/1986 | Cok | 382/22 |
| 4,669,123 | 5/1987 | Kobayashi et al. | 382/8 |
| 4,736,437 | 4/1988 | Saeki et al. | 382/48 |
| 4,791,676 | 12/1988 | Flickner et al. | 382/22 |
| 4,794,647 | 12/1988 | Fagues et al. | 382/8 |
| 4,827,533 | 5/1989 | Tanaka | 382/27 |
| 4,853,968 | 8/1989 | Berkin | 382/8 |
| 4,866,782 | 9/1989 | Sugie et al. | 382/8 |
| 4,972,495 | 11/1990 | Bilke et al. | 382/22 |
| 5,073,958 | 12/1991 | Imme | 382/22 |

OTHER PUBLICATIONS

V. S. Nalwa, "Edge-Detector Resolution Improvement by Image Interpolation", IEEE Transactions on Pattern Analysis and Machine Intelligence, PAMI-9, (May 1987), No. 3, New York, pp. 448–451.

Primary Examiner—Joseph Mancuso
Attorney, Agent, or Firm—Jack D. Slobod

[57] ABSTRACT

For the detection of an amplitude transient in a field of elements having a multivalent amplitude distribution by comparison of amplitude values of neighbouring elements, the amplitude transient is further localised by calculating an interpolation point as a function of amplitude values around the detected amplitude transient, said interpolation point being indicative of the location of the amplitude.

14 Claims, 3 Drawing Sheets

METHOD OF DETECTING AN AMPLITUDE TRANSIENT IN A FIELD OF ELEMENTS HAVING A MULTIVALENT AMPLITUDE DISTRIBUTION, DEVICE SUITABLE FOR PERFORMING THE METHOD, AND VIDEO SYSTEM INCLUDING THE DEVICE

This is a continuation of application Ser. No. 07/581,500, filed Sep. 11, 1990 now abandoned.

BACKGROUND OF THE INVENTION

1. Field of the Invention

The invention relates to a method of detecting an amplitude transient in a field of elements having a multivalent amplitude distribution by comparison of amplitude values of neighbouring elements on a search curve. The invention also relates to a device suitable for performing the method, and to a video system comprising such a device.

2. Description of the Related Art

A method and device of this kind are known from the data sheet "Plessey PDSP 16401 2-Dimensional Edge Detector", May 1986. This sheet describes a CMOS video signal processor for determining the presence, the direction and the magnitude of a gradient of an edge in a video image by multiplying each time a block of amplitude values of 3×3 pixels with four mask matrices. It is thus investigated whether an amplitude transient occurs in the horizontal, the vertical or the diagonal direction. The directions in which a search is made are referred to as search curves. Thus, in this case a search curve is chosen in the horizontal direction, the vertical direction and the diagonal direction. Each time an amplitude transient is searched along a search curve.

It is a drawback of such a method that the determination of the location of an edge is inaccurate: an edge is detected by way of a sufficiently large amplitude difference between neighbouring pixels. For example the sum of the amplitude values of three pixels, succeeding one another transversely to the search curve is compared with a corresponding sum formed by way of pixels located two pixels further along the search curve. If the difference between these sums is greater than a threshold value, the edge is situated at the pixels located between the two relevant threesomes of pixels, i.e. with an accuracy of 1 pixel.

SUMMARY OF THE INVENTION

It is inter alia an object of the invention to provide a method which enables a determination of the location of an amplitude transient which is more accurate than customarily achieved so far.

To achieve this, a method in accordance with the invention is characterized in that an amplitude transient detected along the search curve is further localised by determination of an interpolation point on the relevant search curve in dependence on amplitude values of at least three elements situated on or along the relevant search curve. As a result of this additional calculation, for example in Machine Vision systems the dimensions and positions of objects in images can be more accurately determined. Examples in this respect are the inspection of printed circuit boards and substrates comprising Surface Mounted Devices.

One version of a method in accordance with the invention is characterized in that the interpolation point on the search curve is determined as a function of amplitude values of at least four elements situated on or along the search curve. It has been found that the accuracy is thus enhanced.

A further version of a method in accordance with the invention is characterized in that the interpolation point is determined as a function of sums successively formed along the search curve, each sum relating to a fixed number of amplitude values of elements correspondingly situated near the search curve, which elements succeed one another in a direction transversely of the search curve. Even though the use of sums for the detection of an amplitude transient is known, it offers an additional advantage for the determination of an interpolation point: an even higher accuracy is achieved. Moreover, the risk of undue detection, for example due to a defect or a faulty element, is reduced.

A preferred version of a method in accordance with the invention is characterized in that a third-order polynomial is used as a fit curve, an inflexion point of said polynomial being calculated as the interpolation point. The choice of this version is based on the following considerations. In optics an edge in an image is fit as the convolution of an ideal edge and a point transfer function (see R. C. Gonzalez: "Digital Image Processing", second edition, Addison-Wesley Publishing Company, 1987, Chapter 5: Image Restoration) and resembles an arc tan function around its zero point, or also a third-order polynomial around its inflexion point. The use of an arc tan function for the fit curve introduces arithmetical problems. A third-order polynomial is much more suitable from a numerical point of view. The positioning of the amplitude transient at the area of the inflexion point in the amplitude variation of the successive elements where the amplitude transient occurs, offers an accuracy which is much better than 1 element; it has been found in practice that an accuracy of 1/10 element can be achieved.

DETAILED DESCRIPTION OF THE PREFERRED EMBODIMENTS

Figure 1:
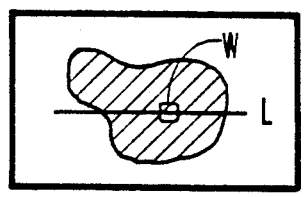
FIG. 1 shows a field of elements having amplitude values.

FIG. 1 shows an example of a two dimensional field of discrete signal elements having a multivalent amplitude distribution. The amplitude value is given for each element. When the amplitude values of two neighbouring elements deviate strongly, for example in excess of a given threshold value, say 5, an amplitude transient occurs. As is indicated in the Figure, the field is divided into two sectors by the amplitude transients.

Figures 2A, 2B:
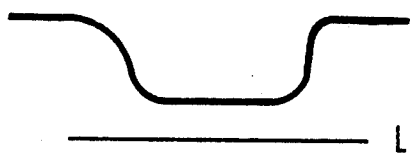
FIG. 2A shows a video image containing an object.
FIG. 2B shows an amplitude profile along the line L of FIG. 2A.

FIG. 2A shows a further example: a video image composed of pixels having a given grey-level. The pixels constitute the elements of the field, and the grey-levels constitute the amplitude values. The video image represents an object which is characterized by deviating grey-levels.

It is to be noted that the applications of a method or a device in accordance with the invention are not restricted to the two-dimensional fields shown. One application of a method in accordance with the invention for a one-dimensional field is, for example the localisation of a 0-1 transition in a digital signal. An application of a method in accordance with the invention for a three-dimensional field is, for example the localisation of an amplitude transient in a data field obtained by computer tomographic examination of an object.

It is also to be noted that a field to be examined and having a multivalent amplitude distribution need not necessarily be subdivided into similar elements, for example as is the case in FIG. 1. A continuous field can also be examined, provided that it can be made discrete by assignment of representative values to parts of the field.

In the case of a field which is composed as a rectangular array, like in FIG. 1, it is attractive to search for amplitude transients in the horizontal and the vertical direction. The search curve or search direction is then formed by one of the main or principal directions of the field along which a "window" W is advanced. It will be evident that a search for amplitude transients can also be made in the diagonal direction or another direction.

If a search curve is chosen which does not extend exactly through but very close to a number of elements, these elements along the search curve can be used for determining the interpolation point.

FIG. 2B shows the amplitude profile of the video image of FIG. 2A along the line L. At the edges of the object each time an amplitude transient occurs. This transient can be detected by comparison of neighbouring pixels. Herein, the line L is the search curve.

Figure 3:
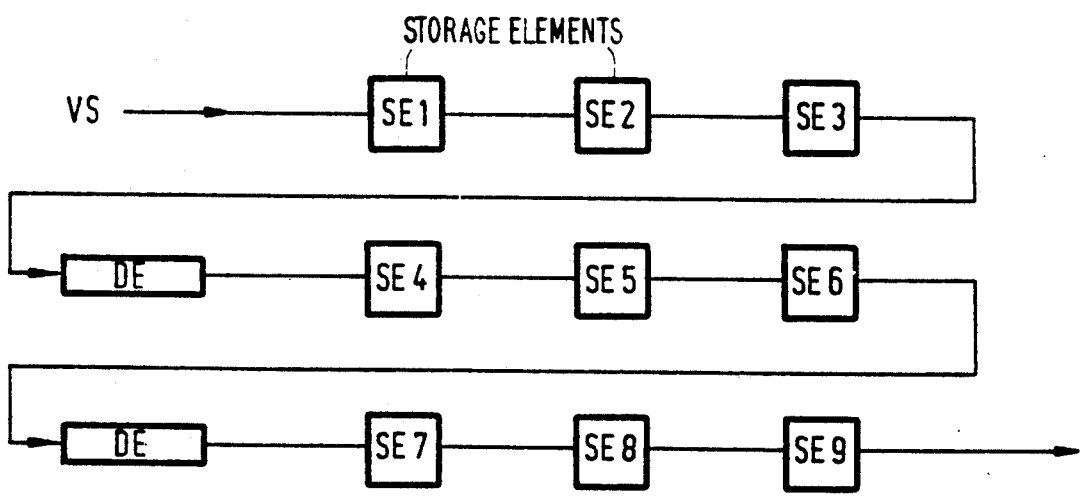
FIGS. 3 and 4 show a known edge detector.

FIG. 3 shows a part of a customary edge detector for video images. A video signal VS containing grey-levels of successive pixels in a video image, is applied to nine series-connected storage elements SE1-SE9, a delay element DE being connected between SE3 and SE4 as well as between SE6 and SE7. A video image is composed of M image lines of N pixels each. The delay elements delay N−3 pixels, so that the storage elements of the edge detector contain each time the grey-levels of a pixel and the eight neighbouring pixels surrounding the relevant pixel in the video image, i.e. an array of pixels selected by a 3×3 "window".

Figure 4:
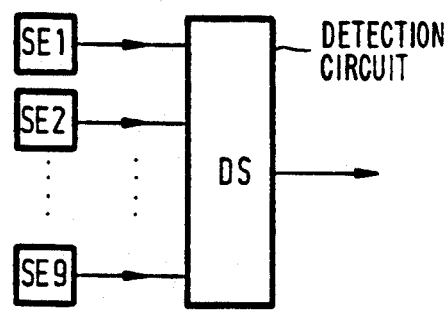

In this customary edge detector, for example in the case of a vertical search curve the grey-levels of SE1, SE2 and SE3, say GR1, GR2 and GR3, are summed in a detection circuit DS so as to be compared with the grey-levels GR7, GR8 and GR9 of SE7, SE8 and SE9 respectively. When the difference between the sums exceeds a threshold value D, an edge has been detected, see FIG. 4.

This can be expressed in the form of a formula as $|GR1+GR2+GR3-GR7-GR8-GR9|>D$, being a horizontal edge. In the detection circuit this operation is often performed simultaneously for a number of search curves or search directions. Each time the amplitude values of three elements succeeding one another transversely of the search curve are summed so as to be compared with the sum of the amplitude values of three corresponding elements situated further along the curve. For example, a horizontal search can be performed: if $|GR1+GR4+GR7-GR3-GR6-GR9|>D$, a vertical edge has been found.

By shifting the "window" of pixel elements instantaneously stored in the storage elements of FIG. 3 across the entire video image, all edges of objects in the video image are thus detected. Dimensions and positions of objects in images can thus be determined.

Figure 5:
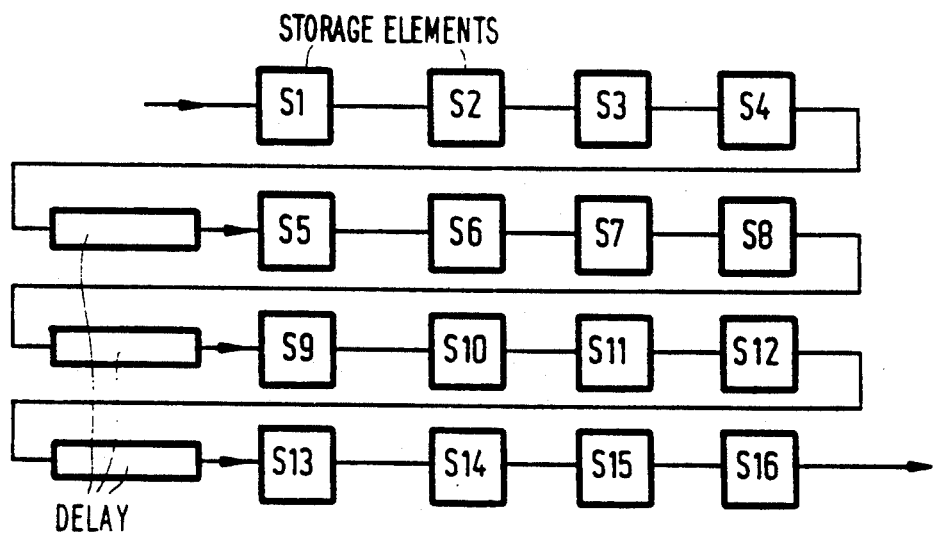
FIGS. 5 and 6 show an edge detector in accordance with the invention.
Figure 6:
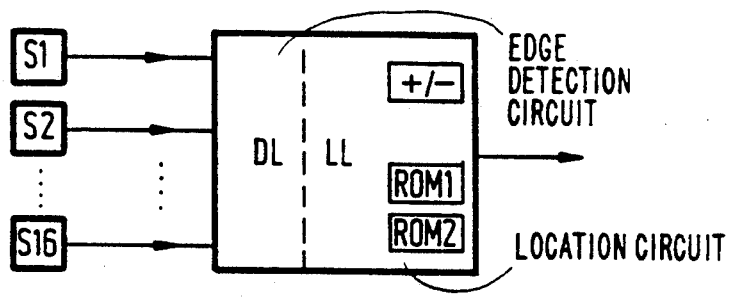

An embodiment of an edge detector in accordance with the invention is shown in FIGS. 5 and 6. Sixteen storage elements S1-S16 are connected, via three delay elements which each delay N−4 pixels, so that they contain a 4×4 environment of a pixel. In the detection circuit DL it is determined whether an edge is concerned. This is performed in substantially the same way as in the customary edge detector. If the difference between the sum of the grey-levels G1 to G8, of S1 to S8, respectively, and the sum of the grey-levels G9 to G16 of S9 to S16, respectively, is greater than a threshold value T, a horizontal edge is concerned:

$$|G1+G2+ \ldots +G8-G9-G10- \ldots -G16|>T$$

is the criterion.

When an edge has been detected by the detection circuit, moreover, in the location circuit LL the location of the edge is more accurately determined by calculation of an interpolation point as a function of the amplitude values of a 4×4 environment of the amplitude gradient.

Figure 7:
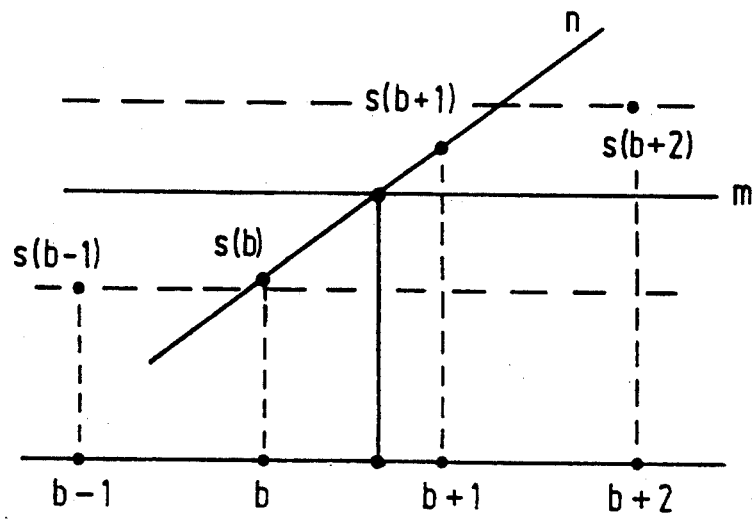
FIG. 7 illustrates a first feasible determination of the interpolation point.

This can be performed, for example, as illustrated in FIG. 7. Assume that the search direction in an image is a vertical direction and that a horizontal edge has been found. Define: $s(b-1):=G1+G2+G3+G4$, $s(b):=G5+G6+G7+G8$, $s(b+1):=G9+G10+G11+G12$, $s(b+2):=G13+G14+G15+G16$. The sums of the amplitude values formed in the horizontal direction exhibit a transient in the vertical direction. The search curve, extending vertically through the image to be examined, is situated along the x-axis in FIG. 7. The magnitude of the sums of the grey-levels is plotted along the y-axis. It holds good that: $|s(b-1)+s(b)-s(b+1)-s(b+2)|>T$.

The amplitude gradient will occur roughly between b and b+1, i.e. in the vicinity of b+½.

The point on the search curve which corresponds to the point of intersection of the lines m and n is chosen as the interpolation point. The line m is the horizontal line through the mean of $s(b+2)$ and $s(b-1)$. The line n is the connecting line between the points $(b,s(b))$ and $(b+1, s(b+1))$. The x-coordinate of the point of intersection found approximates the location of the amplitude transient. The point of intersection is calculated as follows. Using a customary horizontal x-axis and a vertical y-axis, the equation of the lines m and n are:

$$m: y = \frac{s(b+2) + s(b-1)}{2}$$

$$n: y = [s(b+1) - s(b)] \cdot x + s(b) - b \cdot [s(b+1) - s(b)]$$

and for the x-coordinate of the point of intersection it follows therefrom that:

$$x = \frac{s(b+2) + s(b-1) - 2 \cdot s(b)}{2 \cdot [s(b+1) - s(b)]} + b$$

-continued or:

$$x - (b + 1/2) = \frac{s(b+2) - s(b+1) - s(b) + s(b-1)}{2 * [s(b+1) - s(b)]}$$

so that the interpolation point is: $b + \frac{1}{2} + E1$ where $$E1 = \frac{1}{2} * \frac{s(b+2) - s(b+1) - s(b) + s(b-1)}{s(b+1) - s(b)}.$$

Figure 8:
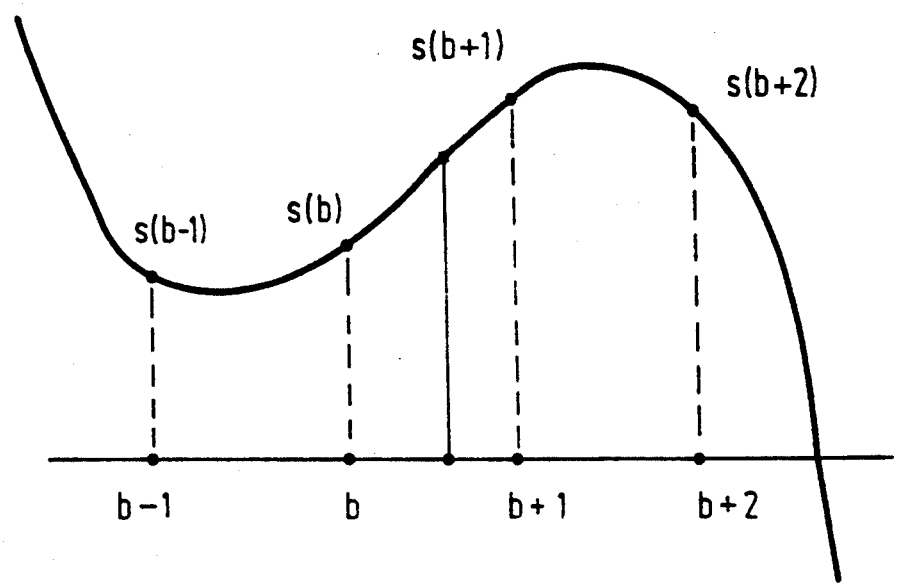
FIG. 8 shows the determination of an inflexion as a further possibility.

FIG. 8 illustrates a further determination of an interpolation point. Therein, use is made of a fitted curve through the calculated sums (in this case a third-order polynomial). The location of the amplitude transient is approximated by calculating an inflexion point in the variation of the grey-levels along the search curve or, in this case, sums of grey-levels of each time four elements succeeding one another transversely of the search curve. The fit curve smoothly interconnects the measuring points. It has been found that the inflexion point is a very good approximation for the location of the detected amplitude transient. The calculation is based on the following. Assume that a horizontal edge has been found. Define: $s(b-1):=G1+G2+G3+G4$, $s(b):=G5+G6+G7+G8$,
$s(b+1):=G9+G10+G11+G12$,
$s(b+2):=G13+G14+G15+G16$.

It holds good that $|s(b-1)+s(b)-s(b+1)-s(b+2)| > T$.

The four points $(b-1), s(b-1))$ to $(b+2, s(b+2))$ determine one third-order polynomial whose coefficients can be found by substitution of the four coordinate pairs in the general function rule of a third-order polynomial:

$$p(x) = a_3 x^3 + a_2 x^2 + a_1 x + a_0$$

where $p(b-1) = s(b-1), \ldots, p(b+2) = s(b+2)$.
Substitution results in:

$$a_3 = \frac{s(b+2) - 3*s(b+1) + 3*s(b) - s(b-1)}{6}$$

and $$a_2 = \frac{s(b+1) - 2*s(b) + s(b-1) - b*[s(b+2) - 3*s(b+1) + 3*s(b) - s(b-1)]}{2}$$

The inflexion point searched is then determined by calculating the zero point of the second derivative function of the polynomial found:

$$p'(x) = 3a_3 x^2 + 2a_2 x + a_1; \quad p''(x) = 6a_3 x + 2a_2;$$

$$p''(x) = 0 \text{ gives } x = \frac{-a_2}{3a_3}$$

The x-coordinate of the inflexion point is then: $b + \frac{1}{2} + E2$, where $$E2 = \frac{1}{2} * \frac{-s(b+2) + s(b+1) + s(b) - s(b-1)}{s(b+2) - 3*s(b+1) + 3*s(b) - s(b-1)}.$$

The implementation of the additions can be readily realised by way of an adder circuit. The division can be performed by means of a (programmable) read-only memory which, given an input value x, delivers an output value ln (x), being the natural logarithm of x, and a (P)ROM which, given an input value y, delivers an output value exp (y), being the anti-logarithm of y. By utilising the generally valid identity:

$$p/q = exp(\ln(p) - \ln(q)),$$

the division can be performed by means of comparatively small (P)ROMs, see FIG. 6.

The following is to be noted as regards the accuracy. An "ideal" amplitude transient where, for example where $s(b-1) = s(b) = 0$ and $s(b+1) = s(b+2) = \Delta$, of course, produces $E2 = 0$. Any error amounting to $\delta$ in one of the sums produces a value in the order of magnitude of $\delta/\Delta$ for E2. This deviation is small if $\delta$ is small with respect to $\Delta$.

It will be evident that fitted curves can also be used in a different manner, for example by determination of the least-squares line: a line which is determined by the measuring points so that the sum of the squares of the deviations of the measuring points with respect to that line is minimum. The x coordinate associated with the y coordinate situated halfway the highest and the lowest amplitude value of the measuring points chosen is an indication of the location of the edge.

Figure 9:
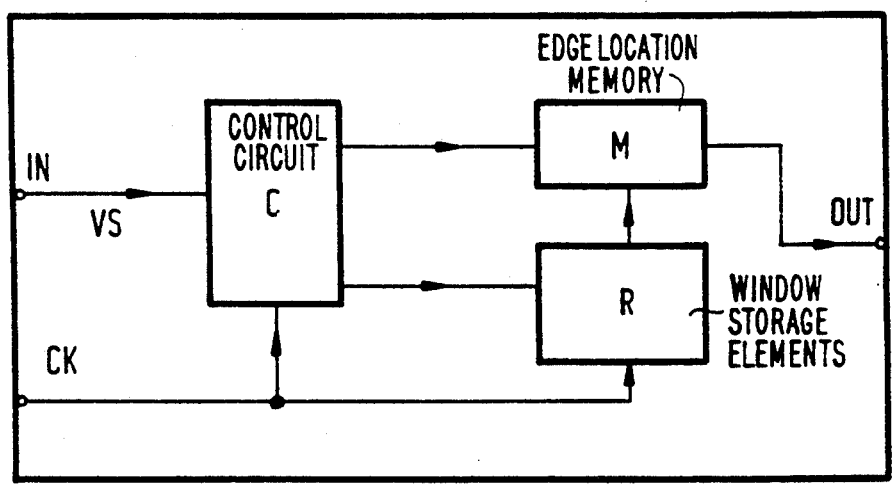
FIG. 9 shows a video system in accordance with the invention.

FIG. 9 shows a video system. Via an input IN a video signal VS is applied to a control circuit C which applies the grey-lines of the relevant pixels of each video image to an edge detector in accordance with the invention: R. The storage elements in R constitute a window which fully scans each video image and investigates where all searched (for example, horizontal and vertical) amplitude transients are situated. In accordance with the invention, these transients are each time more closely localised, the location being applied to a memory M, correct addressing being controlled by the control circuit C. The desired information concerning the edges in each image can be read from the memory M via output OUT. A clock CK controls C and R. In order to digitise a standard TV image in, for example 512×512 pixels, a sampling frequency in the order of magnitude of 10 MHz is required. The calculations in the detection and the location circuit can be performed using the same clock frequency by utilising known pipeline techniques. The additions, the comparison of the sums found and the divisions (using PROMs containing tables of logarithms) can be performed synchronously with the same (sample) clock. The desired result becomes available after a delay amounting to a few clock signals. Real time image processing is thus possible.

I claim:

1. A method of detecting and localizing an amplitude transient by searching along a search curve directed through a field of regularly spaced apart signal elements with a multivalent amplitude distribution, said method comprising:
    obtaining amplitude values of successive arrays of said signal elements selected by respective successive positions of a window onto said field advanced along said search curve, each array including three signal elements arranged along a line;
    detecting the occurrence of an amplitude transient along said line; and
    determining the location of said amplitude transient along said line by interpolating to a fraction, less than $\frac{1}{2}$, of the spacing between adjoining signal elements along said line as a function of the amplitude values of each of said three signal elements.

2. A method as claimed in claim 1, wherein said line is directed in a first direction, said field and each said array of signal elements are arranged in at least two dimensions, so as to define three groups of signal elements arranged in three respective parallel further lines directed in a second direction, each group containing a different one of said three signal elements, and said determining the location of the amplitude transient along said line directed in said first direction comprises forming three respective sums of the amplitude values of the three groups of signal elements, and said interpolating is as a function of each of said three respective sums.

3. A method as claimed in claim 2, wherein the location of the amplitude transient is determined by means of a fitted curve defining said function of said three respective sums.

4. A method as claimed in claim 1, wherein the signal elements of said field comprise pixels of a two-dimensional video image, grey-levels of the pixels constituting the amplitude values.

5. A method as claimed in claim 1, wherein the field of signal elements has one or more principal directions and the search curve is chosen to extend in one of the principal directions.

6. A method as claimed in claim 1, wherein the location of the amplitude transient is determined by means of a fitted curve defining said function of the amplitude values of said three signal elements.

7. A device for detecting and localizing an amplitude transient by searching along a search curve directed through a field of regularly spaced apart signal elements with a multivalent amplitude distribution, said device comprising:
   means for obtaining amplitude values of successive arrays of said signal elements selected by respective successive positions of a window onto said field advanced along said search curve, each array including three signal elements arranged along a line, said obtaining means including storage elements for storing the amplitude values of a current array of signal elements; and
   detection and location circuit means responsive to said storage elements configured for detecting the occurrence of an amplitude transient along said line and determining the location along said line of the detected amplitude transient by interpolating to a fraction, less than ½, of the spacing between adjoining signal elements along said line as a function of the amplitude values of each of said three signal elements.

8. A device as claimed in claim 7, wherein the detection and location circuit means comprises an adder circuit, and read-only memory means containing a table of logarithms and a table of anti-logarithms.

9. A video display system for repeatedly detecting and localizing an amplitude transient in real-time through a succession of fields, corresponding to video images, of regularly spaced apart signal elements with a multivalent amplitude distribution by searching along a search curve directed through each field, said system comprising:
   means for obtaining amplitude values of successive arrays of said signal elements selected by respective successive positions of a window onto each said field advanced along said search curve, each array including three signal elements arranged along a line, said obtaining means including storage elements for storing the amplitude values of a current array of signal elements; and
   detection and location circuit means responsive to said storage elements configured for detecting the occurrence of an amplitude transient along said line and determining the location along said line of the detected amplitude transient by interpolating to a fraction, less than ½, of the spacing between adjoining signal elements along said line as a function of the amplitude values of each of said three signal elements.

10. A method of detecting and localizing an amplitude transient by searching along a search curve directed through a field of regularly spaced apart signal elements with a multivalent amplitude distribution, said method comprising:
    obtaining amplitude values of successive arrays of said signal elements selected by respective successive positions of a window onto said field advanced along said search curve, each array including four signal elements arranged along a line;
    detecting the occurrence of an amplitude transient along said line; and
    determining the location of said amplitude transient along said line by interpolating to a fraction, less than ½, of the spacing between adjoining signal elements along said line as a function of the amplitude values of each of said four signal elements.

11. A method as claimed in claim 10, wherein said fitted curve corresponds to a third-order polynomial, an inflexion point of said polynomial being the location determined.

12. A method as claimed in claim 10, wherein said line is directed in a first direction, said field and each said array of signal elements are arranged in at least two dimensions, so as to define four groups of signal elements arranged in four respective parallel further lines directed in a second direction, each group containing a different one of said four signal elements, and said determining the location of the amplitude transient along said line directed in said first direction comprises forming four respective sums of the amplitude values of the four groups of signal elements, and said interpolating is as a function of each of said four respective sums.

13. A method as claimed in claim 12, wherein the location of the amplitude transient is determined by means of a fitted curve defining said function of said four respective sums.

14. A method as claimed in claim 13, wherein said fitted curve corresponds to a third-order polynomial, an inflexion point of said polynomial being the location determined.

* * * * *